US012784669B2

(12) United States Patent
Gupta et al.

(10) Patent No.: US 12,784,669 B2
(45) Date of Patent: Nov. 3, 2026

(54) NOISE CONTROL IN HORIZONTAL BLANKING PERIODS

(71) Applicant: Microsoft Technology Licensing, LLC, Redmond, WA (US)

(72) Inventors: Vasudha Gupta, Fremont, CA (US); Arie Yehuda Gur, Kiryat Ono (IL); Eli Barel, RoshHaayin (IL); Yichen Tang, Redmond, WA (US); Kyle William Hershey, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/590,581

(22) Filed: Feb. 28, 2024

(65) Prior Publication Data

US 2025/0273136 A1 Aug. 28, 2025

(51) Int. Cl.
*G09G 3/3208* (2016.01)
*G06F 3/041* (2006.01)

(52) U.S. Cl.
CPC ....... *G09G 3/3208* (2013.01); *G06F 3/04162* (2019.05); *G06F 3/04166* (2019.05); *G09G 2310/02* (2013.01); *G09G 2310/08* (2013.01); *G09G 2320/0247* (2013.01); *G09G 2340/0435* (2013.01); *G09G 2354/00* (2013.01); *G09G 2360/144* (2013.01)

(58) Field of Classification Search
None
See application file for complete search history.

(56) References Cited

U.S. PATENT DOCUMENTS

| | | | | |
|---|---|---|---|---|
| 10,261,626 | B2 * | 4/2019 | Shepelev | G06F 3/04164 |
| 12,190,768 | B1 * | 1/2025 | Hsu | G01J 1/4204 |
| 2013/0194229 | A1 | 8/2013 | Sabo et al. | |
| 2015/0049049 | A1 * | 2/2015 | Kim | G06F 3/044 345/174 |
| 2015/0097799 | A1 | 4/2015 | Buuck et al. | |
| 2015/0205438 | A1 | 7/2015 | Kremin et al. | |
| 2015/0346902 | A1 * | 12/2015 | Wyatt | G06F 3/04166 345/173 |
| 2018/0366081 | A1 * | 12/2018 | Jangda | G09G 3/3655 |
| 2019/0156753 | A1 * | 5/2019 | Yang | G09G 3/3266 |
| 2020/0226978 | A1 * | 7/2020 | Lin | H10K 59/1213 |
| 2021/0090509 | A1 * | 3/2021 | Zheng | H03F 3/087 |
| 2021/0350763 | A1 * | 11/2021 | Okamura | G06F 3/0412 |

(Continued)

*Primary Examiner* — Sarvesh J Nadkarni
(74) *Attorney, Agent, or Firm* — Holzer Patel Drennan

(57) ABSTRACT

An electronic device initiates a scan of a display frame in the display, the scan displaying a sequence of display rows from a starting point of the frame to an ending point of the display frame. A horizontal blanking period is positioned in time between each display row during which display emissions are turned off. The electronic device progressively scans a first sub-sequence of the display rows in the sequence during a first time period and then scans a display row having a quiet period inserted into a horizontal blanking period adjacent to the display row. Display pixel operations are delayed until expiration of the quiet period during the horizontal blanking period. The electronic device then progressively scans a second sub-sequence of the display rows in the sequence during a second time period.

23 Claims, 8 Drawing Sheets

(56) References Cited

U.S. PATENT DOCUMENTS

| | | | | |
|---|---|---|---|---|
| 2022/0137773 | A1 * | 5/2022 | Lim .................... | G06F 3/04166<br>345/173 |
| 2023/0214058 | A1 * | 7/2023 | Kallio ................... | G06F 3/0421<br>345/175 |

* cited by examiner

NOISE CONTROL IN HORIZONTAL BLANKING PERIODS

BACKGROUND

For Active Matrix OLED (AMOLED) displays of small to medium size (e.g., mobile, notebook, laptop), touch/stylus sensors can be laid out on top of the Organic Light Emitting Diode (OLED) encapsulation with photolithography as part of the panel manufacturing process, eliminating the need for a discrete touch sensor film. For example, several plastic OLED panels of a mobile device size use touch process technology to reduce the thickness of the display module by 50-70 μm. touch process technology can eliminate the need for a separate touch flex circuit, as touch and display signals can be present on the same panel substrate. Overall, this configuration enables a simpler, more reliable module construction. Touch process technology can also be applied for laptop-size AMOELD on plastic or Hybrid OLEDs that have a glass substrate for the panel but thin film encapsulation to seal the OLED layers. Touch process technology can also be used for foldable AMOLEDs with different sizes and form factors.

SUMMARY

In some aspects, the techniques described herein relate to a method of mitigating noise coupling in a display, the method including: initiating a scan of a display frame in the display, the scan displaying a sequence of display rows from a starting point of the frame to an ending point of the display frame, wherein a horizontal blanking period is positioned in time between each display row during which display emissions are turned off; progressively scanning a first sub-sequence of the display rows in the sequence during a first time period; scanning a display row having a quiet period inserted into a horizontal blanking period adjacent to the display row, wherein display pixel operations are delayed until expiration of the quiet period during the horizontal blanking period, based at least upon progressively scanning the first sub-sequence of the display rows; and progressively scanning a second sub-sequence of the display rows in the sequence during a second time period, based at least upon scanning the display row having the quiet period.

In some aspects, the techniques described herein relate to an electronic device including a display, the electronic device including: a display control circuitry configured to initiate a scan of a display frame in the display, the scan displaying a sequence of display rows from a starting point of the frame to an ending point of the display frame, a horizontal blanking period being positioned in time between each display row during which display emissions are turned off, wherein the display control circuitry is further configured to: progressively scan a first sub-sequence of the display rows in the sequence during a first time period, scan a display row having a quiet period inserted into a horizontal blanking period adjacent to the display row, wherein the quiet period extends for one or more clock cycles and display pixel operations are delayed until expiration of the quiet period during the horizontal blanking period, based at least upon progressively scanning the first sub-sequence of the display rows, and progressively scan a second sub-sequence of the display rows in the sequence during a second time period, based at least upon scanning the display row having the quiet period.

In some aspects, the techniques described herein relate to one or more tangible processor-readable storage media embodied with instructions for executing on one or more processors and circuits of a computing device a process for mitigating noise coupling in a display, the process including: initiating a scan of a display frame in the display, the scan displaying a sequence of display rows from a starting point of the frame to an ending point of the display frame, wherein a horizontal blanking period is positioned in time between each display row during which display emissions are turned off; progressively scanning a first sub-sequence of the display rows in the sequence during a first time period; scanning a display row having a quiet period inserted into a horizontal blanking period adjacent to the display row, wherein display pixel operations are delayed until expiration of the quiet period during the horizontal blanking period, based at least upon progressively scanning the first sub-sequence of the display rows; and progressively scanning a second sub-sequence of the display rows in the sequence during a second time period, based at least upon scanning the display row having the quiet period.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
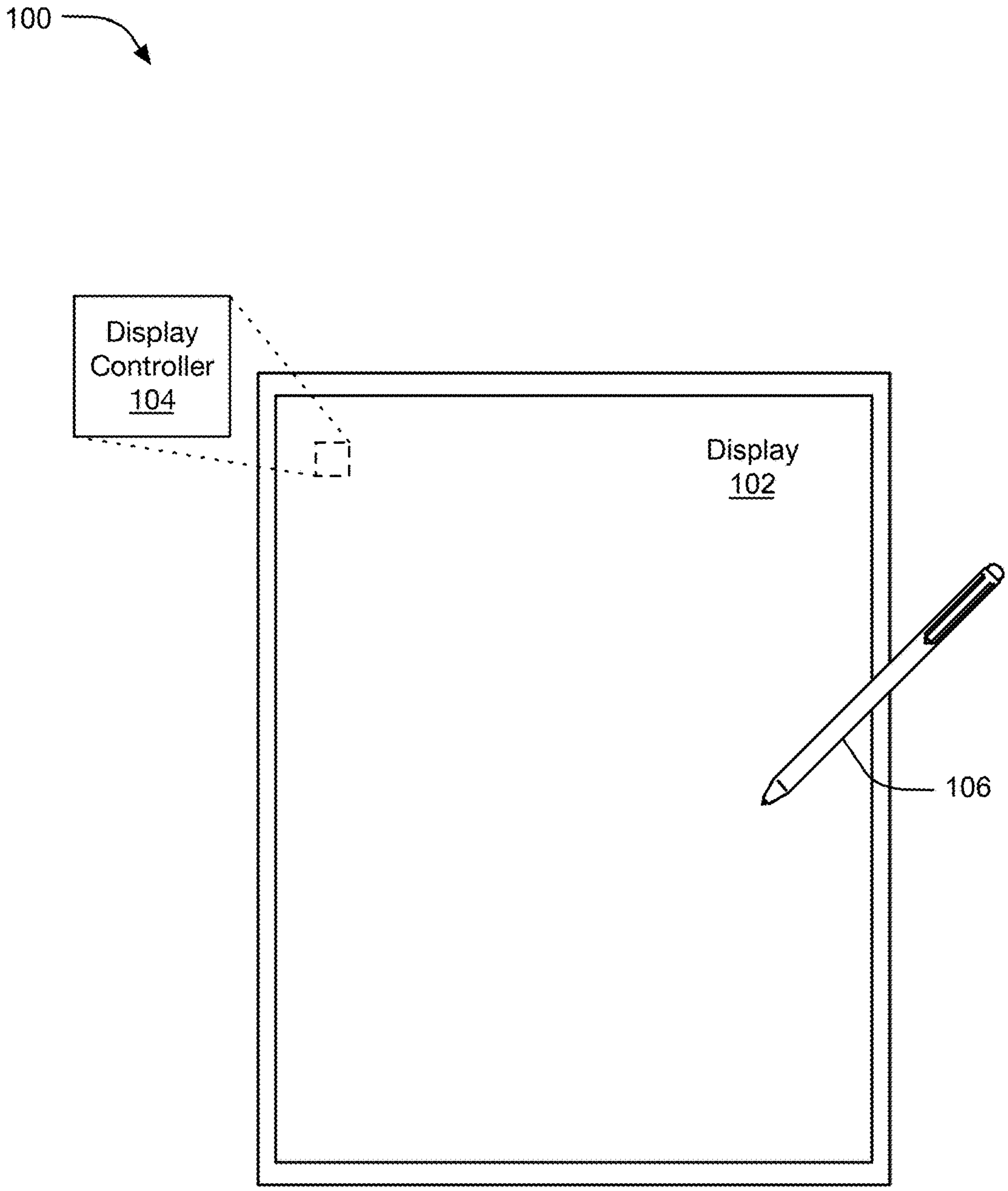
FIG. 1 illustrates an example display device that supports touch and/or stylus functionality.

While touch process technology provides some advantages in the construction and operation of computing device displays, many touch process technology sensors are also closer to the display than in previous technologies. Hence one side effect of touch process technology is increased coupling between the display and a touch/stylus sensor, for example. Specifically, the OLED cathode, which acts like a metal shield between the display and touch portions is not a perfect ground. A light emitting diode is connected between an anode and a cathode to supply a current of electrons that are injected into the diode. Cathode material and thickness are chosen to carefully balance the needs of OLED device design, optical transparency, and electrical conductivity rather than grounding performance. Typical sheet resistance for current prevailing cathode materials is in the range of 7-10 ohms square (Ω□). As a result, noise injected onto the cathode layer is not discharged to ground immediately, which can cause either touch-to-display or display-to-touch cross-coupling. The amount of injected noise resulting from such cross-coupling can depend on several factors, including one or more of the amplitude, phase and the number of toggling display/touch signals, size of the panel, display timing, etc. The described technology is described herein as being applicable to touch process technology-type designs but can also be applied to discrete touch sensor films on OLED (glass or plastic) displays, and other types of display technologies.

Of particular interest is the case of a pen or stylus, where a large amplitude stimulus might be applied to all the digitizer antennas (e.g., transmitters/receivers) at the same time, although touch sensors and optical sensors may cause similar effects. This stimulus can couple with the display data line and/or pixel internal nodes to change the voltage that is programmed into a pixel displayed on the display, resulting in noise effects that can cause optical artifacts observable in the display, such as line flicker, tearing, and intermittent luminance spikes.

The described technology provides a timing scheme to reduce or eliminate such noise effects in a display by inserting quiet periods during select horizontal blanking periods of a frame refresh (e.g., while scanning a display frame). Furthermore, controlling and/or extending emission off periods can also reduce or eliminate such noise effects in a display. Display sensor activity, including, without limitation, stylus communications (uplink and/or downlink), digitizer touch sensing, and ambient light sensing, is constrained to be active during the quiet period and inactive outside the quiet period. Display pixel operations are delayed until the expiration of the quiet period during the select horizontal blanking periods. In this manner, display sensor activity does not overlap display pixel operations, thereby mitigating the noise effects of coupling between the display and a display sensor.

An additional benefit of this timing scheme may be achieved in the use of under-display sensors, such as Ambient Light Sensors (ALSs) and Ambient Color Sensors (ACSs). These sensors sense ambient light/color from a placement under the OLED panel (backside layers, such as foam, etc., are removed locally). The light generated by the OLED pixels located on top of the ALS/ACS (called back-emission) is typically subtracted from the sensor input. In contrast, the timing scheme described herein allows sensor activation timing to be synchronized to instantaneous emission OFF periods during the display frame to help minimize the impact of back-emission.

FIG. 1 illustrates an example display device 100 that supports touch and/or stylus functionality. In some implementations, the example display device 100 may also or alternatively support ambient light sensing functionality. The display device 100 is illustrated as an electronic device that includes a display 102, a display controller 104, a digitizer, communication antennas, and/or other display sensors (e.g., touch sensors, optical sensors), although other configurations may be employed. A digitizer or other communication antennas can communicate with an active stylus or other devices in a unidirectional or bidirectional sense. Touch sensors can detect touch actions (such as a human touch or contact by a stylus on the display screen). An optical sensor can detect the presence, strength, and/or frequency components of ambient light.

The display controller 104 includes display control circuitry, including one or more transistors, and may be controlled by a display controller driver (e.g., in software or firmware). The transistors can provide a variety of switching functions, including, without limitation, an emission ON/OFF functionality, an anode reset functionality, a drive switching functionality, and, generally, display pixel operations, such as pixel data programming, diode initialization, and diode threshold voltage sampling (Vth sampling).

The display controller 104 controls the timing of scanning-related operations to display a sequence of display frames. For example, during a display frame refresh, the display controller 104 can initiate a scan of a display frame in the display 102, which displays a sequence of display rows that constitute the display frame. The display controller 104 is configured with various display parameters, described below, that manage the display frame refresh operation. Typically, a display frame refresh includes a scan of display rows (or lines) from the top of the display 102 to the bottom of the display 102, with each display row being scanned from left to right within the display 102, although other formats may be employed.

By performing a sequence of frame refreshes according to the display parameters, the display controller 104 can scan display frames consisting of a sequence of display rows while mitigating the effects of noise induced on the cathode of the display 102. Such mitigation can be achieved by excluding display pixel operations during a quiet period inserted into a horizontal blanking (HB) period between display rows and constraining noisy coupling operations (e.g., uplink and/or downlink communications between a digitizer and a stylus, touch sensing, optical sensing of ambient light) to occur only or mostly during the quiet periods.

A stylus 106 is also illustrated in FIG. 1. In some implementations, the display device 100 can communicate unidirectionally or bidirectionally with the stylus 106, such as to transmit commands, firmware updates, etc. or to receive commands from the stylus 106 (e.g., toggling erase mode). Other implementations of the described technology may not support stylus functionality.

Figure 2:
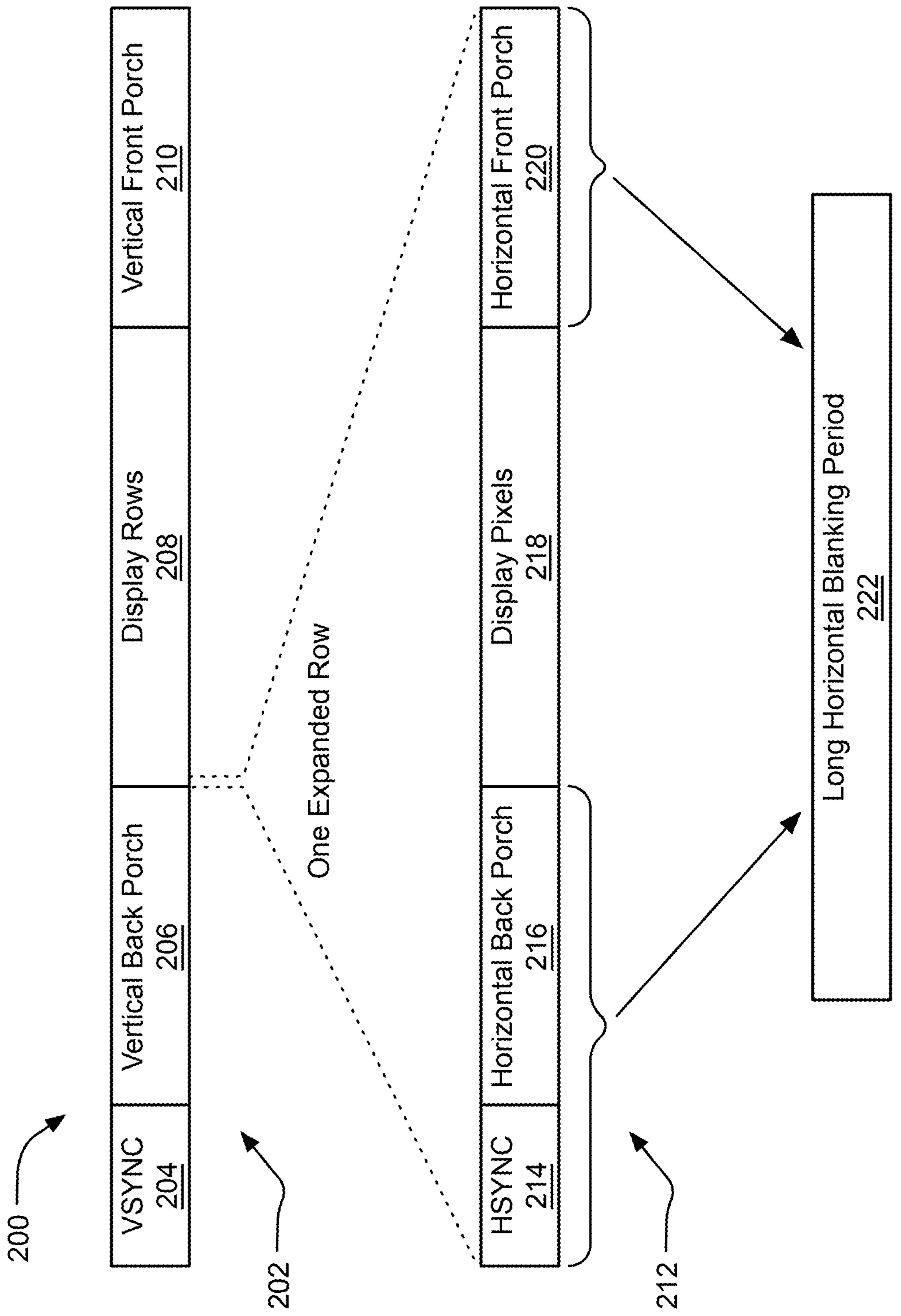
FIG. 2 illustrates example frame and row timing parameters as they relate to a long horizontal blanking period.

FIG. 2 illustrates example frame and row timing parameters 200 as they relate to a long horizontal blanking period. Each display frame includes a vertical blanking period and multiple horizontal blanking periods during which emissions are turned off. Some or all of the periods outside the blanking periods include display scans that emit light from pixels in the display within a region referred to as an "active display region."

The term "long horizontal blanking period" is being used to describe a horizontal blanking period that is generally longer in duration than traditional horizontal blanking periods because the long horizontal blanking period has been extended to accommodate a quiet period, which delays display pixel operations within the long horizontal blanking period. In various implementations, the long horizontal blanking period is applied between every display row in a display frame, although in some implementations, different display rows may have different long horizontal blanking period durations. Furthermore, in some implementations, although the display rows of a display frame are separated by long horizontal blanking periods, only one or more display rows per display frame are selected to include a quiet period in an adjacent long horizontal blanking period. Other display rows are still separated by long horizontal blanking periods that have not been inserted with a quiet period.

Turning to FIG. 2, a timing scheme 202 illustrates portions of a display frame refresh. A VSYNC portion 204 denotes a vertical synchronization period on a per-display frame basis, synchronizing the display of a display frame on a display device with the initiation of a display frame refresh by a display controller. Vertical synchronization may be accomplished using one or more vertical synchronization pulses, although many different vertical synchronization methods and control signal formats may be employed by different electronic display devices. A primary result is that the initiation of a display frame refresh is synchronized between the display controller and the display. Accordingly, subsequent timing events within the display frame refresh are at least initially based on this vertical synchronization.

The VSYNC portion 204 is followed by a vertical back porch portion 206, which denotes the number of horizontal sync pulses between the VSYNC portion 204 and the scan of the first display row into the active display region. The vertical back porch portion 206 is followed by a display rows portion 208 in which the display rows of the display frame are scanned into the active display region of the display. The display rows portion 208 is followed by a vertical back porch 210, which denotes the number of horizontal sync pulses between the scan of the last display row into the active display region and the VSYNC portion 204. The VSYNC portion 204, the vertical back porch portion 206, and the vertical back porch 210, in combination, represent a vertical blanking period.

A timing scheme 212 is applied to each display row of the display rows portion 208, as illustrated by the one expanded row. An HSYNC portion 214 denotes a horizontal synchronization period on a per-display row basis, synchronizing the display of a display row on a display device with the initiation of a display row refresh by a display controller. Horizontal synchronization may be accomplished using one or more horizontal synchronization pulses, although many different horizontal synchronization methods and control signal formats may be employed by different electronic display devices. A primary result is that the initiation of a display row refresh is synchronized between the display controller and the display. Accordingly, subsequent timing events within the display row refresh are at least initially based on this horizontal synchronization.

The HSYNC portion 214 is followed by a horizontal back porch portion 216, which denotes the number of pixel sync pulses between the HSYNC portion 214 and the scan of the first display pixel of the display row into the active display region. The horizontal back porch portion 216 is followed by a display pixels portion 218 in which the display pixels of the display row are scanned into the active display region of the display. The display pixels portion 218 is followed by a horizontal back porch 220, which denotes the number of pixel sync pulses between the scan of the last pixel into the active display region and the next HSYNC portion 214. The HSYNC portion 214, the horizontal back porch portion 216, and the horizontal back porch 220, in combination, represent a horizontal blanking period, or specifically a long horizontal blanking period 222 in the described technology. The long horizontal blanking period 222 is extended to be longer than traditional horizontal blanking periods to allow the insertion of a quiet period into the long horizontal blanking periods adjacent to one or more select display rows.

Figure 3:
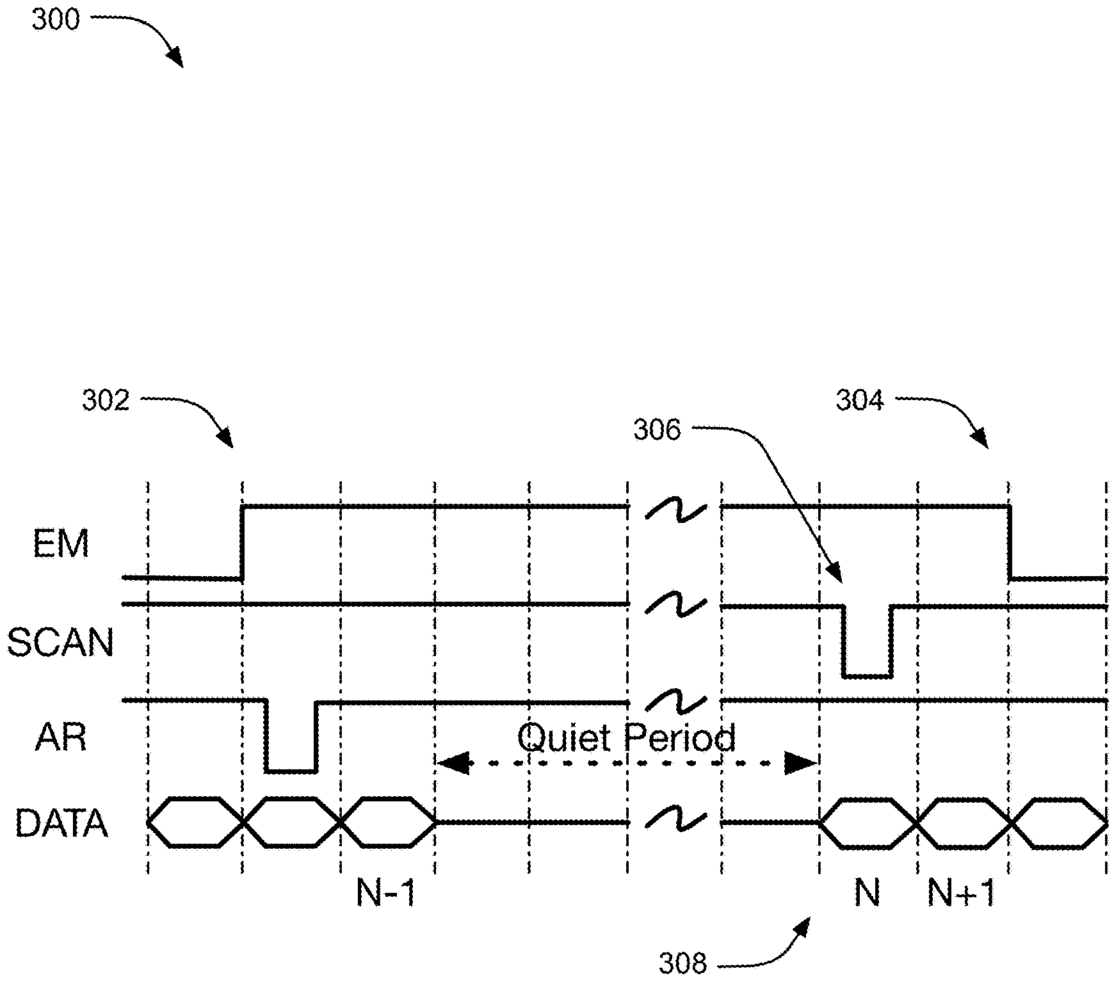
FIG. 3 illustrates example display signals for a display row within a long horizontal blanking period.

FIG. 3 illustrates example display signals 300 for a display row within a long horizontal blanking period. Designations for each signal are provided along the left of the display signals 300, wherein "EM" denotes an emissions control signal, "SCAN" denotes a scan pulse signal, "AR" denotes an anode reset signal, and DATA denotes a pixel data programming signal. The emissions control signal turns on pixel emissions when low and turns off pixel emissions when high. Accordingly, pixel emissions are turned off at clock cycle 302 and on again at clock cycle 304. The scan pulse signal provides a horizontal synchronization (HSYNC) pulse to synchronize the display of a display row between a display device and a display controller. The anode reset signal triggers the discharge/initialization of the anode of the light emitting diode. A pixel programming signal writes new pixel data into a pixel, which is displayed when the emissions are turned on again. Writing new pixel data is a type of display pixel operation.

As can be seen in the display signals 300, during the long horizontal blanking period, the emissions control signal turns off emissions at clock cycle 302. In the next clock cycle, the OLED anode is pulsed to discharge/initialize the OLED anode. Subsequently, the quiet period is initiated, during which the horizontal synchronization (HSYNC) pulse 306 and display pixel operations, such as pixel data programming, are delayed until the expiration of the quiet period at clock pulse 308.

During the quiet period, display pixel operations are delayed or suspended. As such, other operations that are likely to generate noise coupling between the display and display sensors can be executed without generating artifacts in the display. For example, the following operations, without limitation, may be considered noisy in this regard:

1. Stylus uplink communications—a quiet period can be used to drive uplink signals (digitizer to stylus) without interfering with display operation (e.g., such interference can result in horizontal line flickering in the display)
2. Stylus downlink communications—a quiet period can be used to drive downlink signals (stylus to digitizer) without display signals substantially interfering with stylus to digitizer communications (e.g., such interference can result in erroneous or inconsistent inking in the display)
3. Digitizer touch sensing—a quiet period can be used to drive touch sensing signals in the digitizer without interfering with display operation (e.g., such interference can result in horizontal line flickering in the display)
4. Optical sensor under OLED—a quiet period can be used to detect clean/clear ambient light without OLED back emission light or crosstalk One or more of such noisy operations may be constrained to execute within the quiet period to mitigate the noise coupling effects that cause undesirable display artifacts.

Figure 4:
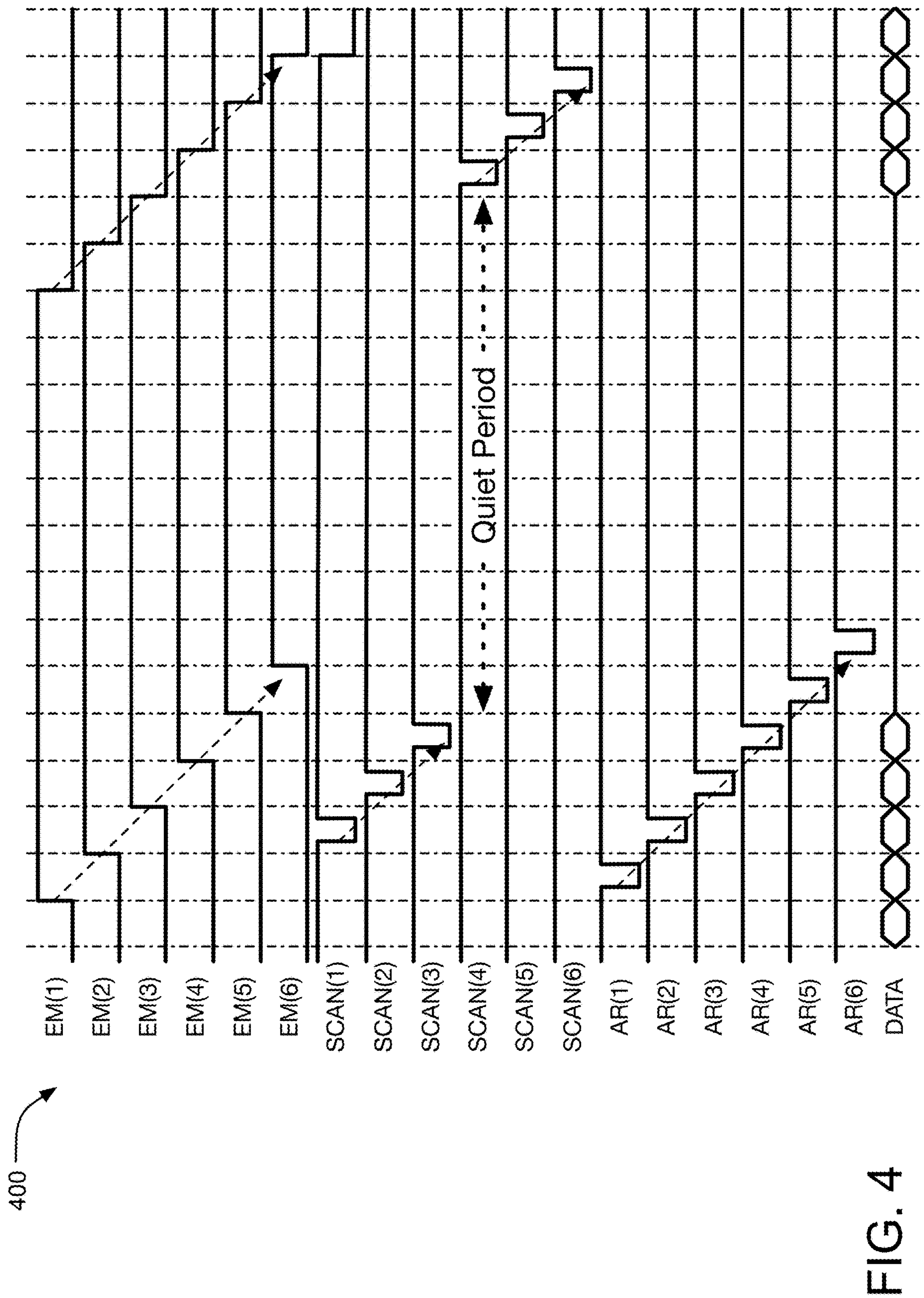
FIG. 4 illustrates example display signals for multiple display rows scanned in the context of long horizontal blanking periods.

FIG. 4 illustrates example display signals 400 for multiple display rows scanned in the context of long horizontal blanking periods. FIG. 4 shows six display rows of a display frame being progressively scanned (as denoted by the diagonal dashed line arrows) in sequence. Different rows are indicated by the indices 1-6 in parentheses of each signal.

As illustrated, a quiet period is not inserted into the long horizontal blanking period of display rows 1-3. Display rows 1-3 represent a sub-sequence of the overall sequence of display rows in a frame. Accordingly, the scan pulses for display rows 1-3 and pixel data programming are not initially delayed or suspended in these display rows. Such delays or suspensions are not needed in the horizontal blanking periods adjacent to all display rows in a frame, as one or more select horizontal blanking periods per frame can be inserted with a quiet period per frame without undesirably diminishing the touch functionality, stylus functionality, and/or other sensing functionality (e.g., ambient optical sensing). Accordingly, the quiet period timing can be deliberately configured to maintain acceptable display, touch, stylus, and/or sensing performance without needing to insert a quiet period in every horizontal blanking period.

In FIG. 4, the display row 4 has been selected for insertion of a quiet period, during which the scan pulse for the display row 4 and pixel data programming are delayed or suspended. Furthermore, in some implementations, the scan pulses of subsequent display rows in the sequence are also delayed to maintain the progressive scanning protocol. Display rows 5-6 represent another sub-sequence of the display rows of a frame. Additional sub-sequences and display rows, including horizontal blanking periods containing inserted quiet periods, may also exist within a single display frame. See, e.g., the discussion below relating to quiet period insertions in the context of variable refresh rate (VRR).

Figure 5:
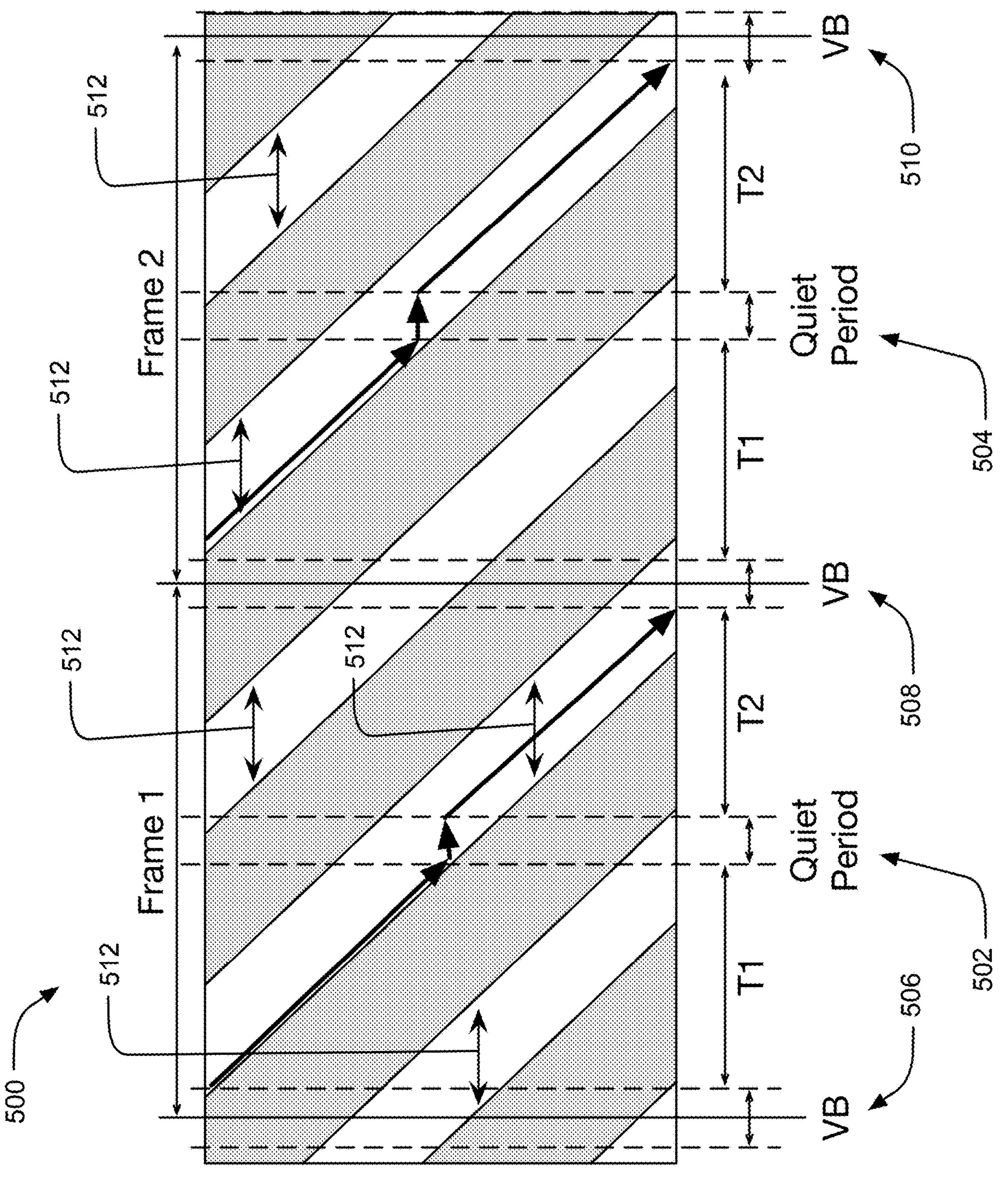
FIG. 5 illustrates example full frame timing views with quiet period insertions.

FIG. 5 illustrates example full frame timing views 500 with quiet period insertions. Frame 1 is illustrated on the left, bounded by a vertical blanking (VB) period 506 on one side and a vertical blanking (VB) period 508 on the other side. A quiet period 502 is inserted substantially into a horizontal blanking period in the middle of the frame. Frame 2 is illustrated on the right, bounded by the vertical blanking (VB) period 508 on one side and a vertical blanking (VB) period 510 on the other side. A quiet period 504 is inserted substantially into a horizontal blanking period in the middle of the frame. The diagonal lines and arrows denote the progressive scanning through all display rows of each display frame.

The display row in each frame is selected such that the time periods (T1 and T2) on either side of the display row with the inserted quiet period are substantially of the same duration (i.e., T1≈T2). Furthermore, the durations 512 of the long horizontal blanking periods of all display rows in each display frame are also of substantially the same duration (i.e., the durations of the horizontal blanking periods adjacent to each display row are substantially the same). Maintaining substantial uniformity in the spacings between inserted quiet periods can provide a technical benefit of reducing flicker in the display and synchronizing stylus stimulus with quiet periods irrespective of when a new frame is initiated. Maintaining substantial uniformity in the horizontal blanking periods in the frame can provide a technical benefit of reducing visual tearing in the display.

Figure 6:
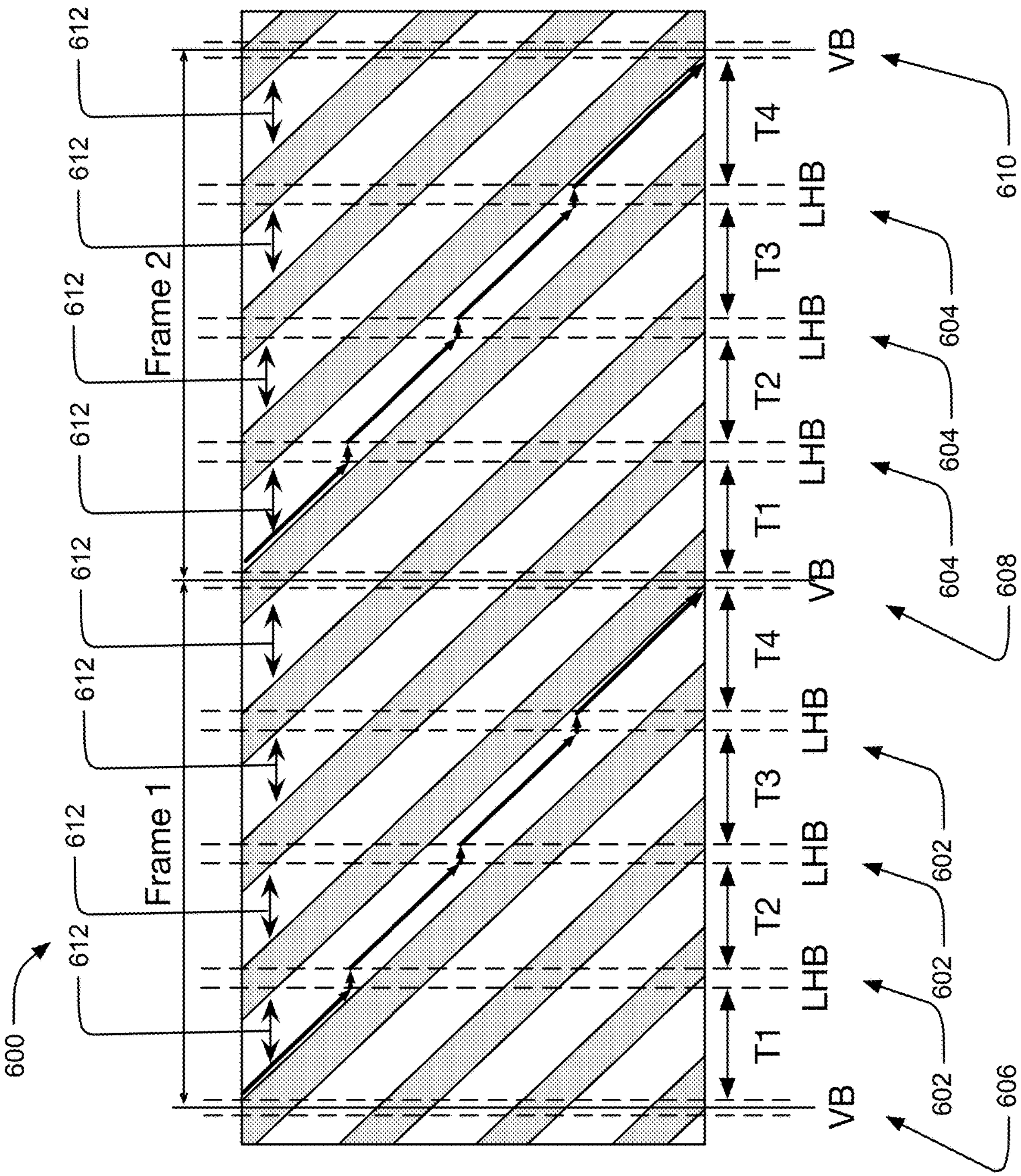
FIG. 6 illustrates example full frame timing views with multiple long horizontal blanking period insertions with multiple quiet period insertions per frame for variable rate refresh.

FIG. 6 illustrates example full frame timing views with multiple long horizontal blanking period insertions with multiple quiet period insertions per frame for variable rate refresh. While maximum OLED panel refresh rates typically range from 60-144 Hz, the lowest refresh rate can go down to as low as 1 Hz to conserve power. For low refresh rate scenarios (e.g., PSR or panel self-refresh), the total time to refresh new data on all rows remains the same as in the case of maximum refresh rate. For example, if the maximum refresh rate is 120 Hz with panel refresh time as ~8 ms, then, even for the minimum supported refresh rate of 30 Hz, the total duration of panel refresh remains ~8 ms. Accordingly, the blanking times are extended to get an overall low refresh rate of 30 Hz.

During the extended blanking period, even though there is no data refresh and SCAN operation is disabled, EM ON/OFF and Anode Reset continue to be asserted. In other words, EM and Anode Reset have the same frequency for all panel refresh rates. For example, EM and Anode reset could work at 240 Hz for all refresh rates when the maximum refresh rate is 120 Hz. This configuration causes the periodicity of the panel optical response to remain the same regardless of the refresh rate, which also keeps the perceived time average brightness the same for all refresh rates.

For very low refresh rates (e.g., 1 Hz), the extended blanking time could be ~992 ms (~8 ms out of 1 s used for data program with a maximum refresh rate of 120 Hz). New image content from the application processor could be received anytime during the extended blanking period. To ensure that incoming program data is not dropped, the extended blanking time may be interrupted (or truncated) to insert a new image frame. Effectively, this is the case for VRR (Variable Refresh Rate) functionality, where the display panel should support multiple refresh rates between the minimum and maximum supportable refresh rates. The anode reset period can be used as a time step to interrupt the blanking time, thereby keeping the optical response waveform and the resulting front-of-screen optical performance (luminance, color) the same aligned with interrupt-induced refresh rate transitions for VRR.

To minimize VRR latency, the time step between interrupt points can be configured (e.g., to be shorter). For example, the maximum panel refresh rate could be 120 Hz (~8 ms), but the latency may be reduced to 4 ms or 2 ms and EM/Anode Reset rate to be 240 Hz or 480 Hz, respectively. Accordingly, the extended blanking can be truncated every 4 ms or 2 ms, even when the stylus stimulus is applied every 8 ms (120 Hz). Assuming that the panel timing is designed with a single LHB and VB as quiet periods for a 120 Hz refresh rate, the quiet period rate is 240 Hz. Depending on the time point where the new frame is initiated, the 120 Hz stylus stimulus could overlap with either quiet periods (LHB, VB) or with SCAN periods. Accordingly, multiple display rows having quiet period insertions may be applied to variable refresh rate functionality.

Assuming that the maximum panel refresh rate is 120 Hz, with 480 Hz EM/Anode Reset, display panel timing is designed with a single LHB and VB as quiet periods. So, the quiet period rate is 240 Hz. Stylus stimulus, for example, is applied to the stylus or touch sensor at the rate of 240 Hz. Accordingly, each new display frame is initiated such that the stylus stimulus time overlaps with quiet periods VB, LHB (240 Hz). In this case, the stylus stimulus will not induce any noise on the display and no adverse optical impact on the display.

However, if the new frame is initiated (interrupts possible every 2.08 ms with 480 Hz EM/AR rate) such that the stylus stimulus periods do NOT overlap with quiet periods VB and LHB (red arrows), the display pixel operations are not paused while the stylus stimulus is applied, so touch to display noise can induce flicker. This issue can be mitigated if the quiet period rate is also 480 Hz, resulting in quiet period insertions into three LHBs and one VB per 120 Hz frame. Effectively, the quiet period rate should be the same as the EM/AR rate to align the stylus stimulus with a quiet period, irrespective of where the new frame is initiated. D with 2 extra LHBs.

Based on these observations, FIG. 6 illustrates example full frame timing views 600 with quiet period insertions 602 and quiet period insertions 604. Frame 1 is illustrated on the left, bounded by a vertical blanking (VB) period 606 on one side and a vertical blanking (VB) period 608 on the other side. Frame 2 is illustrated on the right, bounded by the vertical blanking (VB) period 608 on one side and a vertical blanking (VB) period 610 on the other side. The quiet periods are inserted into three horizontal blanking periods spaced substantially evenly within each frame. The diagonal lines and arrows denote the progressive scanning through all display rows of each display frame.

The display row in each frame is selected such that the time periods (T1, T2, T3, and T4) between display rows with the inserted quiet periods are substantially of the same duration (i.e., T1~T2~T3~T4). Furthermore, the durations 612 (and other unmarked durations) of the long horizontal blanking periods of all display rows in each display frame are also of substantially the same duration (i.e., the durations of the horizontal blanking periods adjacent to each display row are substantially the same). Maintaining substantial uniformity in the spacings between inserted quiet periods can provide a technical benefit of reducing flicker in the display and synchronizing stylus stimulus with quiet periods irrespective of when a new frame is initiated, which is especially beneficial in VRR operation.

Figure 7:
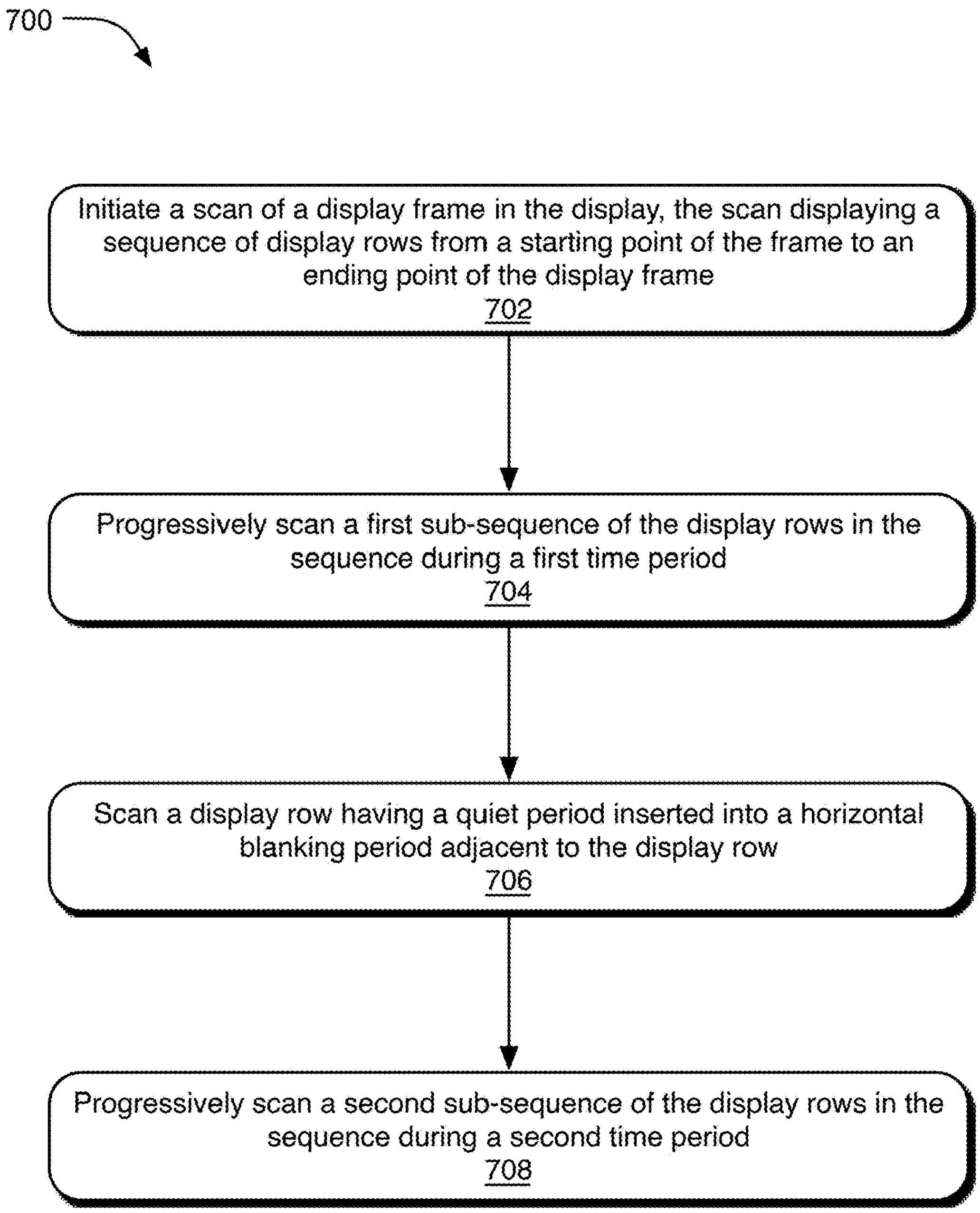
FIG. 7 illustrates example operations for providing noise control in long horizontal blanking periods.

FIG. 7 illustrates example operations 700 for providing noise control in long horizontal blanking periods. The example operations 700 are capable of mitigating noise coupling between a display and a display sensor. An initiation operation 702 initiates a scan of a display frame in the display to display a sequence of display rows from a starting point of the frame to an ending point of the display frame. A horizontal blanking period is positioned in time between each display row, during which display emissions are turned off, and a vertical blanking period is positioned in time on each side of the frame. The initiation operation 702, for example, may synchronize the scan based on a VSYNC pulse in one of the vertical blanking periods.

A first scanning operation 704 progressively scans a first sub-sequence of the display rows in the sequence during a first time period. In one implementation, the first sub-sequence of display rows may include the display rows scanned between the vertical blanking period at the start of the frame and the first display row adjacent to a horizontal blanking period containing an inserted quiet period (see, e.g., the display rows scanned during time T1 in FIG. 5). In another implementation, the first sub-sequence of display rows may include the display rows scanned between the vertical blanking period at the start of the frame and the first display row adjacent to a horizontal blanking period containing an inserted quiet period (see, e.g., the display rows scanned during time T1 in FIG. 6) or the display rows scanned between two display rows adjacent to horizontal blanking periods containing inserted quiet periods (see, e.g., the display rows scanned during times T2 and T3 in FIG. 6).

A second scanning operation 706 scans a display row having a quiet period inserted into a horizontal blanking period adjacent to the display row. Display pixel operations and a horizontal scan pulse are delayed until the expiration of the quiet period during the horizontal blanking period, based at least upon progressively scanning the first sub-sequence of the display rows, thereby mitigating risks of display artifacts such as flicker.

A third scanning operation 708 progressively scans a second sub-sequence of the display rows in the sequence during a second time period, based at least upon scanning the display row having the quiet period. In one implementation, the second sub-sequence of display rows may include the display rows scanned between the last display row adjacent to a horizontal blanking period containing an inserted quiet period and the vertical blanking period at the end of the frame (see, e.g., the display rows scanned during time T2 in FIG. 5). In another implementation, the second sub-sequence of display rows may include the display rows scanned between two display rows adjacent to horizontal blanking periods containing inserted quiet periods (see, e.g., the display rows scanned during times T2 and T3 in FIG. 6) or the display rows scanned between the first display row adjacent to a horizontal blanking period containing an inserted quiet period and the vertical blanking period at the end of the frame (see, e.g., the display rows scanned during time T4 in FIG. 6).

Portions of these operations 700 may be repeated. For example, the operations 700 may be repeated for each frame. Additionally, in the case of a frame having multiple inserted quiet periods, various scanning operations may be repeated to accommodate the multiple inserted periods. For example, in one of the frames shown in FIG. 6, the sequence of operations may include the following sequence:

1) The first scanning operation 704 executes in T1
2) The second scanning operation 706 executes at the end of T1
3) The third scanning operation 708 executes in T2
4) The second scanning operation 706 executes again at the end of T2
5) The third scanning operation 708 executes again in T3
6) The second scanning operation 706 executes again at the end of T3
7) The third scanning operation 708 executes again in T4

Figure 8:
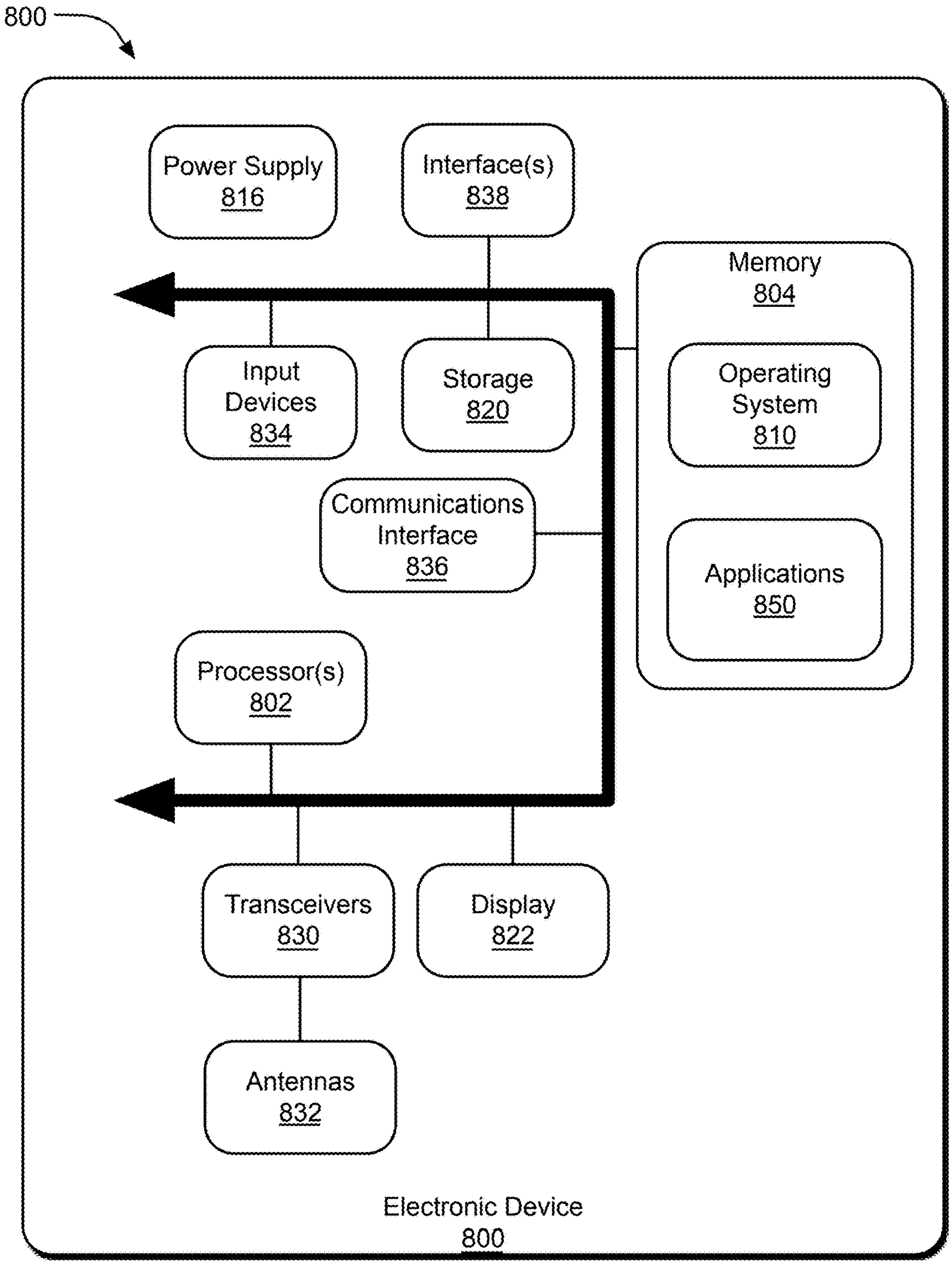
FIG. 8 illustrates an example electronic device for use in implementing the described technology.

FIG. 8 illustrates an example electronic device 800 for use in implementing the described technology. The electronic device 800 may be a client computing device (such as a laptop computer, a desktop computer, or a tablet computer), a server/cloud computing device, an Internet-of-Things (IoT), any other type of computing device, or a combination of these options. The electronic device 800 includes one or more hardware processor(s) 802 and a memory 804. The memory 804 generally includes both volatile memory (e.g., RAM) and nonvolatile memory (e.g., flash memory), although one or the other type of memory may be omitted. An operating system 810 resides in the memory 804 and is executed by the processor(s) 802. In some implementations, the electronic device 800 includes and/or is communicatively coupled to storage 820.

In the example electronic device 800, as shown in FIG. 8, one or more software modules, segments, and/or processors, such as applications 850, a display controller driver, and other program code and modules are loaded into the operating system 810 on the memory 804 and/or the storage 820 and executed by the processor(s) 802. The storage 820 may store a pixel data, timing parameters, and other data and be local to the electronic device 800 or may be remote and communicatively connected to the electronic device 800. In particular, in one implementation, components of a system for mitigating noise coupling in a display may be implemented entirely in hardware or in a combination of hardware circuitry and software.

The electronic device 800 includes a power supply 816, which may include or be connected to one or more batteries or other power sources, and which provides power to other components of the electronic device 800. The power supply 816 may also be connected to an external power source that overrides or recharges the built-in batteries or other power sources.

The electronic device 800 may include one or more communication transceivers 830, which may be connected to one or more antenna(s) 832 to provide network connectivity (e.g., mobile phone network, Wi-Fi®, Bluetooth®) to one or more other servers, client devices, IoT devices, and other computing and communications devices. The electronic device 800 may further include a communications interface 836 (such as a network adapter or an I/O port, which are types of communication devices). The electronic device 800 may use the adapter and any other types of communication devices for establishing connections over a wide-area network (WAN) or local-area network (LAN). It should be appreciated that the network connections shown are exemplary and that other communications devices and means for establishing a communications link between the electronic device 800 and other devices may be used.

The electronic device 800 may include one or more input devices 834 such that a user may enter commands and information (e.g., a keyboard, trackpad, or mouse). These and other input devices may be coupled to the server by one or more interfaces 838, such as a serial port interface, parallel port, or universal serial bus (USB). The electronic device 800 may further include a display 822, such as a touchscreen display.

The electronic device 800 may include a variety of tangible processor-readable storage media and intangible processor-readable communication signals. Tangible processor-readable storage can be embodied by any available media that can be accessed by the electronic device 800 and can include both volatile and nonvolatile storage media and removable and non-removable storage media. Tangible processor-readable storage media excludes intangible and transitory communications signals (such as signals per se) and includes volatile and nonvolatile, removable and non-removable storage media implemented in any method, process, or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the electronic device 800. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Clause 1. A method of mitigating noise coupling in a display, the method comprising: initiating a scan of a display frame in the display, the scan displaying a sequence of display rows from a starting point of the frame to an ending point of the display frame, wherein a horizontal blanking period is positioned in time between each display row during which display emissions are turned off; progressively scanning a first sub-sequence of the display rows in the sequence during a first time period; scanning a display row having a quiet period inserted into a horizontal blanking period adjacent to the display row, wherein display pixel operations are delayed until expiration of the quiet period during the horizontal blanking period, based at least upon progressively scanning the first sub-sequence of the display rows; and progressively scanning a second sub-sequence of the display rows in the sequence during a second time period, based at least upon scanning the display row having the quiet period.

Clause 2. The method of clause 1, wherein the horizontal blanking periods between the display rows of the first sub-sequence and between the display rows of the second sub-sequence do not include quiet periods.

Clause 3. The method of clause 1, wherein the first time period and the second time period are substantially of a same duration.

Clause 4. The method of clause 1, wherein display pixel operations include one or more of pixel initialization, diode threshold voltage sampling, or pixel data programming.

Clause 5. The method of clause 1, wherein the horizontal blanking period including the quiet period includes an emission off signal, followed by an anode reset signal, followed by the quiet period, followed by one or more display pixel operations.

Clause 6. The method of clause 1, further comprising: scanning another display row having a quiet period inserted into a horizontal blanking period adjacent to the other display row, wherein display pixel operations are delayed until expiration of the quiet period during the horizontal blanking period; and progressively scanning a third sub-sequence of the display rows in the sequence during a third time period.

Clause 7. The method of clause 6, wherein the horizontal blanking periods between the display rows of the first sub-sequence, between the display rows of the second sub-sequence, and between the display rows of the third sub-sequence do not include quiet periods and the first time period, the second time period, and the third time period are substantially of a same duration.

Clause 8. An electronic device including a display, the electronic device comprising: a display control circuitry configured to initiate a scan of a display frame in the display, the scan displaying a sequence of display rows from a starting point of the frame to an ending point of the display frame, a horizontal blanking period being positioned in time between each display row during which display emissions are turned off, wherein the display control circuitry is further configured to: progressively scan a first sub-sequence of the display rows in the sequence during a first time period, scan a display row having a quiet period inserted into a horizontal blanking period adjacent to the display row, wherein the quiet period extends for one or more clock cycles and display pixel operations are delayed until expiration of the quiet period during the horizontal blanking period, based at least upon progressively scanning the first sub-sequence of the display rows, and progressively scan a second sub-sequence of the display rows in the sequence during a second time period, based at least upon scanning the display row having the quiet period.

Clause 9. The electronic device of clause 8, wherein the horizontal blanking periods between the display rows of the first sub-sequence and between the display rows of the second sub-sequence do not include quiet periods.

Clause 10. The electronic device of clause 8, further comprising: a touch sensor configured to detect a touch action during the quiet period through the display.

Clause 11. The electronic device of clause 8, further comprising: a digitizer configured to perform communications with a stylus during the quiet period through the display.

Clause 12. The electronic device of clause 8, further comprising: an optical sensor configured to detect ambient light during the quiet period.

Clause 13. The electronic device of clause 8, wherein the horizontal blanking period including the quiet period includes an emission off signal, followed by an anode reset signal, followed by the quiet period, followed by one or more display pixel operations.

Clause 14. The electronic device of clause 8, further comprising: scanning another display row having a quiet period inserted into a horizontal blanking period adjacent to the other display row, wherein display pixel operations are delayed until expiration of the quiet period during the horizontal blanking period; and progressively scanning a third sub-sequence of the display rows in the sequence during a third time period.

Clause 15. One or more tangible processor-readable storage media embodied with instructions for executing on one or more processors and circuits of a computing device a process for mitigating noise coupling in a display, the process comprising: initiating a scan of a display frame in the display, the scan displaying a sequence of display rows from a starting point of the frame to an ending point of the display frame, wherein a horizontal blanking period is positioned in time between each display row during which display emissions are turned off; progressively scanning a first sub-sequence of the display rows in the sequence during a first time period; scanning a display row having a quiet period inserted into a horizontal blanking period adjacent to the display row, wherein display pixel operations are delayed until expiration of the quiet period during the horizontal blanking period, based at least upon progressively scanning the first sub-sequence of the display rows; and progressively scanning a second sub-sequence of the display rows in the sequence during a second time period, based at least upon scanning the display row having the quiet period.

Clause 16. The one or more tangible processor-readable storage media of clause 15, wherein the horizontal blanking periods between the display rows of the first sub-sequence sequence and between the display rows of the second sub-sequence do not include quiet periods.

Clause 17. The one or more tangible processor-readable storage media of clause 15, wherein the first time period and the second time period are substantially of a same duration.

Clause 18. The one or more tangible processor-readable storage media of clause 15, wherein display pixel operations include one or more of pixel initialization, diode threshold voltage sampling, or pixel data programming.

Clause 19. The one or more tangible processor-readable storage media of clause 15, wherein the horizontal blanking period including the quiet period includes an emission off signal, followed by an anode reset signal, followed by the quiet period, followed by one or more display pixel operations.

Clause 20. The one or more tangible processor-readable storage media of clause 15, further comprising: scanning another display row having a quiet period inserted into a horizontal blanking period adjacent to the other display row, wherein display pixel operations are delayed until expiration of the quiet period during the horizontal blanking period; and progressively scanning a third sub-sequence of the display rows in the sequence during a third time period, wherein the horizontal blanking periods between the display rows of the first sub-sequence, between the display rows of the second sub-sequence, and between the display rows of the third sub-sequence do not include quiet periods and the first time period, the second time period, and the third time period are substantially of a same duration.

Clause 21. A system for mitigating noise coupling in a display, the system comprising: means for initiating a scan of a display frame in the display, the scan displaying a sequence of display rows from a starting point of the frame to an ending point of the display frame, wherein a horizontal blanking period is positioned in time between each display row during which display emissions are turned off; means for progressively scanning a first sub-sequence of the display rows in the sequence during a first time period; means for scanning a display row having a quiet period inserted into a horizontal blanking period adjacent to the display row, wherein display pixel operations are delayed until expiration of the quiet period during the horizontal blanking period, based at least upon progressively scanning the first sub-sequence of the display rows; and means for progressively scanning a second sub-sequence of the display rows in the sequence during a second time period, based at least upon scanning the display row having the quiet period.

Clause 22. The system of clause 21, wherein the horizontal blanking periods between the display rows of the first sub-sequence and between the display rows of the second sub-sequence do not include quiet periods.

Clause 23. The system of clause 21, wherein the first time period and the second time period are substantially of a same duration.

Clause 24. The system of clause 21, wherein display pixel operations include one or more of pixel initialization, diode threshold voltage sampling, or pixel data programming.

Clause 25. The system of clause 21, wherein the horizontal blanking period including the quiet period includes an emission off signal, followed by an anode reset signal, followed by the quiet period, followed by one or more display pixel operations.

Clause 26. The system of clause 21, further comprising: means for scanning another display row having a quiet period inserted into a horizontal blanking period adjacent to the other display row, wherein display pixel operations are delayed until expiration of the quiet period during the horizontal blanking period; and means for progressively scanning a third sub-sequence of the display rows in the sequence during a third time period.

Clause 27. The system of clause 26, wherein the horizontal blanking periods between the display rows of the first sub-sequence, between the display rows of the second sub-sequence, and between the display rows of the third sub-sequence do not include quiet periods and the first time period, the second time period, and the third time period are substantially of a same duration.

Some implementations may comprise an article of manufacture, which excludes software per se. An article of manufacture may comprise a tangible storage medium to store logic and/or data. Examples of a storage medium may include one or more types of computer-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable types of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method of mitigating noise coupling in a display, the method comprising:

initiating a scan of a display frame in the display, the scan displaying a sequence of display rows from a starting point of the display frame to an ending point of the display frame, wherein a horizontal blanking period is positioned in time between each display row during which display emissions are turned off;

progressively scanning a first sub-sequence of the display rows in the sequence during a first time period;

scanning a display row having a quiet period inserted into a first horizontal blanking period adjacent to the display row, wherein the quiet period is shorter than the first horizontal blanking period, wherein display pixel operations are performed during the first horizontal blanking period outside of the quiet period and are excluded during the quiet period, based at least upon progressively scanning the first sub-sequence of the display rows; and progressively scanning a second sub-sequence of the display rows in the sequence during a second time period, based at least upon scanning the display row having the quiet period.

2. The method of claim 1, wherein the horizontal blanking periods between the display rows of the first sub-sequence and between the display rows of the second sub-sequence do not include quiet periods.

3. The method of claim 1, wherein the first time period and the second time period are substantially of a same duration.

4. The method of claim 1, wherein display pixel operations include one or more of pixel initialization, diode threshold voltage sampling, or pixel data programming.

5. The method of claim 1, wherein the first horizontal blanking period including the quiet period includes an emission off signal, followed by an anode reset signal, followed by the quiet period, followed by one or more display pixel operations.

6. The method of claim 1, further comprising:

scanning another display row having a quiet period inserted into a second horizontal blanking period adjacent to the other display row, wherein display pixel operations are delayed until expiration of the quiet period during the second horizontal blanking period; and progressively scanning a third sub-sequence of the display rows in the sequence during a third time period.

7. The method of claim 6, wherein the horizontal blanking periods between the display rows of the first sub-sequence, between the display rows of the second sub-sequence, and between the display rows of the third sub-sequence do not include quiet periods and the first time period, the second time period, and the third time period are substantially of a same duration.

8. The method of claim 1, wherein the display pixel operations include pixel data programming.

9. The method of claim 1, wherein the first horizontal blanking period is positioned between adjacent display rows of the display frame.

10. An electronic device including a display, the electronic device comprising:

a display control circuitry configured to initiate a scan of a display frame in the display, the scan displaying a sequence of display rows from a starting point of the display frame to an ending point of the display frame, a horizontal blanking period being positioned in time between each display row during which display emissions are turned off, wherein the display control circuitry is further configured to:

progressively scan a first sub-sequence of the display rows in the sequence during a first time period, scan a display row having a quiet period inserted into a first horizontal blanking period adjacent to the display row, wherein the quiet period is shorter than the first horizontal blanking period, the quiet period extends for one or more clock cycles, and display pixel operations are performed during the first horizontal blanking period outside of the quiet period and are excluded during the quiet period, based at least upon progressively scanning the first sub-sequence of the display rows, and progressively scan a second sub-sequence of the display rows in the sequence during a second time period, based at least upon scanning the display row having the quiet period.

11. The electronic device of claim 10, wherein the horizontal blanking periods between the display rows of the first sub-sequence and between the display rows of the second sub-sequence do not include quiet periods.

12. The electronic device of claim 10, further comprising:

a touch sensor configured to detect a touch action during the quiet period through the display.

13. The electronic device of claim 10, further comprising:

a digitizer configured to perform communications with a stylus during the quiet period through the display.

14. The electronic device of claim 10, further comprising:

an optical sensor configured to detect ambient light during the quiet period.

15. The electronic device of claim 10, wherein the first horizontal blanking period including the quiet period includes an emission off signal, followed by an anode reset signal, followed by the quiet period, followed by one or more display pixel operations.

16. The electronic device of claim 10, further comprising:

scanning another display row having a quiet period inserted into a second horizontal blanking period adjacent to the other display row, wherein display pixel operations are delayed until expiration of the quiet period during the second horizontal blanking period; and progressively scanning a third sub-sequence of the display rows in the sequence during a third time period.

17. One or more tangible processor-readable storage media embodied with instructions for executing on one or more processors and circuits of a computing device a process for mitigating noise coupling in a display, the process comprising:

initiating a scan of a display frame in the display, the scan displaying a sequence of display rows from a starting point of the display frame to an ending point of the display frame, wherein a horizontal blanking period is positioned in time between each display row during which display emissions are turned off;

progressively scanning a first sub-sequence of the display rows in the sequence during a first time period;

scanning a display row having a quiet period inserted into a first horizontal blanking period adjacent to the display row, wherein the quiet period is shorter than the first horizontal blanking period and display pixel operations are performed during the first horizontal blanking period outside of the quiet period and are excluded during the quiet period, based at least upon progressively scanning the first sub-sequence of the display rows; and progressively scanning a second sub-sequence of the display rows in the sequence during a second time period, based at least upon scanning the display row having the quiet period.

18. The one or more tangible processor-readable storage media of claim 17, wherein the horizontal blanking periods between the display rows of the first sub-sequence and between the display rows of the second sub-sequence do not include quiet periods.

19. The one or more tangible processor-readable storage media of claim 17, wherein the first time period and the second time period are substantially of a same duration.

20. The one or more tangible processor-readable storage media of claim 17, wherein display pixel operations include one or more of pixel initialization, diode threshold voltage sampling, or pixel data programming.

21. The one or more tangible processor-readable storage media of claim 17, wherein the first horizontal blanking period including the quiet period includes an emission off signal, followed by an anode reset signal, followed by the quiet period, followed by one or more display pixel operations.

22. The one or more tangible processor-readable storage media of claim 17, further comprising:

scanning another display row having a quiet period inserted into a second horizontal blanking period adjacent to the other display row, wherein display pixel operations are delayed until expiration of the quiet period during the second horizontal blanking period; and progressively scanning a third sub-sequence of the display rows in the sequence during a third time period, wherein the horizontal blanking periods between the display rows of the first sub-sequence, between the display rows of the second sub-sequence, and between the display rows of the third sub-sequence do not include quiet periods and the first time period, the second time period, and the third time period are substantially of a same duration.

23. The one or more tangible processor-readable storage media of claim 17, wherein the display pixel operations include pixel data programming.

* * * * *